INVENTORS.
ROBERT L. HUGHES
JOHN H. HOLLINGSWORTH
WAYNE H. GARSIDE

BY Herman Seid

ATTORNEY.

Oct. 11, 1966 R. L. HUGHES ETAL 3,277,956
AIR HEATING AND COOLING APPARATUS
Filed Oct. 26, 1961 3 Sheets-Sheet 2

INVENTORS.
ROBERT L. HUGHES
JOHN H. HOLLINGSWORTH
WAYNE H. GARSIDE
BY *Herman Seid*
ATTORNEY.

Oct. 11, 1966 R. L. HUGHES ETAL 3,277,956
AIR HEATING AND COOLING APPARATUS
Filed Oct. 26, 1961 3 Sheets-Sheet 3
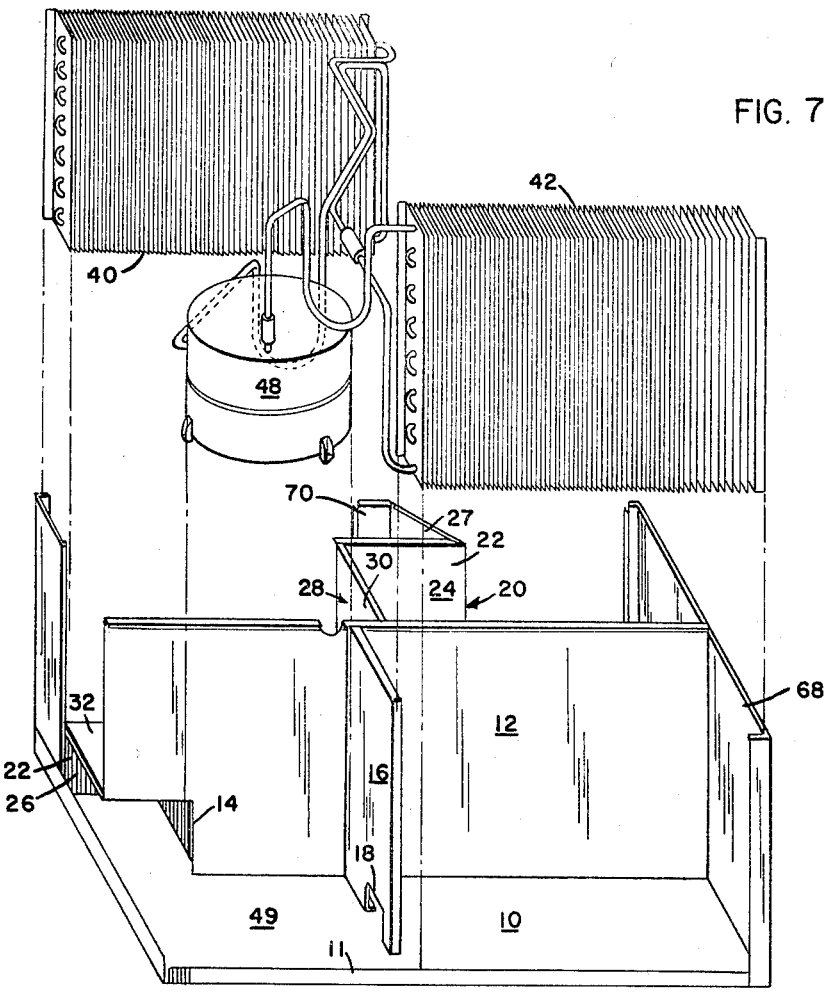
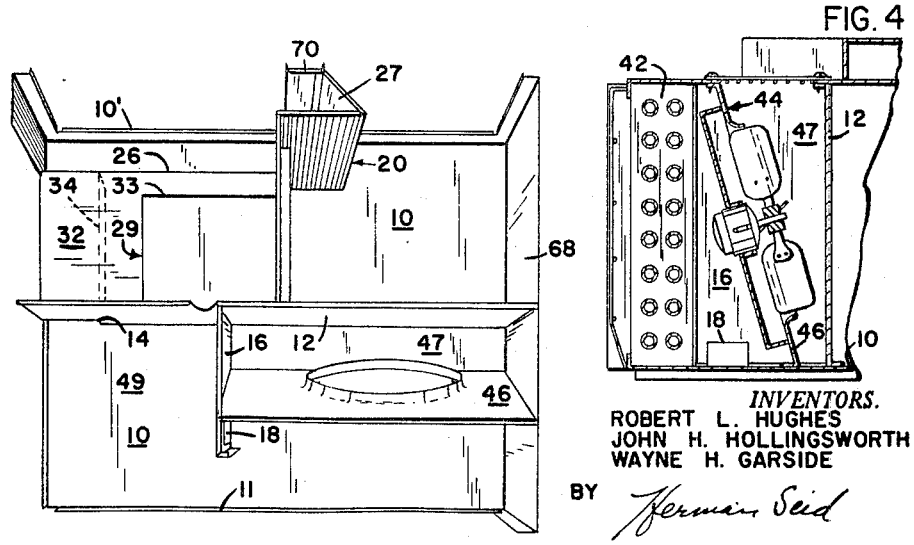
INVENTORS.
ROBERT L. HUGHES
JOHN H. HOLLINGSWORTH
WAYNE H. GARSIDE
BY Herman Seid
ATTORNEY.

3,277,956
AIR HEATING AND COOLING APPARATUS
Robert L. Hughes, West Covina, John H. Hollingsworth, Fullerton, and Wayne H. Garside, Arcadia, Calif., assignors to Carrier Corporation, Syracuse, N.Y., a corporation of Delaware
Filed Oct. 26, 1961, Ser. No. 147,848
10 Claims. (Cl. 165—64)

This invention relates broadly to apparatus for selectively heating and cooling air. More particularly, this invention relates to apparatus for selectively heating and cooling air to be supplied to an enclosure where it is desired to maintain comfortable air temperature.

Many units have been proposed for the purpose of both heating and cooling air circulating within an enclosure such as a house or residential building. Among those proposed is the heat pump which broadly includes an air circulation system and a refrigeration system. The heat pump is operable under one cycle to absorb heat from the air circulating within the enclosure and under a second cycle to reject heat, previously absorbed from a heat source such as ambient air, to the air circulating within the enclosure. The heat pump operation is shifted from one cycle to the other by either reversing a substantial part of the refrigerant flow path while maintaining the air flow paths fixed through the unit or by shifting the air flow paths while maintaining the refrigerant flow path in the refrigeration system undisturbed. One disadvantage of a heat pump of the kind described is that very often the heat source for the refrigeration system during operation on the heating cycle, is ambient air. In many geographical areas the ambient air temperature often drops well below 32° F., the recognized freezing point of water, providing a heat source of a very low order during the cycle of operation when a relatively high order heat source is required. Under these circumstances, supplemental heating means such as electric resistance heaters must be incorporated in the apparatus in order to satisfy the heating requirement imposed thereon. In addition, the heat transfer member employed in the refrigeration system to extract heat from the ambient during heat cycle operation becomes frosted as condensate formed on the low temperature heat transfer member freezes with the surface temperature of the member reduced below the freezing point of water. Efficient heat pump operation requires periodic defrosting which often involves temporarily cycling the apparatus onto cooling cycle operation in order to pump hot gaseous refrigerant, intended for delivery in heat transfer relation with the air stream circulating within the enclosure, to the frosted heat transfer member associated with the ambient air stream. Thus during the time required to effect defrost of the outdoor heat transfer member the air circulating within the enclosure passes over the indoor heat transfer member acting temporarily as an evaporator or heat extraction element.

It has also been proposed to modify residential warm air furnaces of the forced air type to include, in the air stream discharged from the furnace, an evaporator of a refrigeration system for the purpose of cooling air flowing to the enclosure from the furnace. Under these circumstances it will be understood that the heat generating components of the furnace are inactive and satisfactory comfort conditions in the enclosure require cooling of the air circulating therein. With the arrangement described, it is, of course, necessary to make provision for the other components of the refrigeration system including the heat generating motor-compressor unit and the condenser. In the past, it has been practice to mount these elements outside the enclosure and use ambient air as a cooling medium for condensing refrigerant and dissipating heat. Such an arrangement involves extensive piping for refrigerant flow which, of course, provides additional hazards as far as damage to the equipment is concerned as well as additional expense.

It is accordingly the chief object of this invention to provide an improved apparatus for heating or cooling air supplied to an enclosure, in which a separate facility is employed to heat the air and a separate facility is employed to cool the air although only a single path for the flow of the air is provided.

Another object of the invention is the provision of apparatus of the kind described wherein all of the components are arranged within a single housing provided with readily removable access panels whereby the various subassemblies forming the unit may be selectively serviced without disassembly of any other of the subassemblies.

A further object of the invention is the provision of a self-contained apparatus for selectively heating and cooling air delivered to an enclosure wherein a separate refrigeration system is employed to cool the air and a separate direct fired heating facility including a heat exchanger is used to heat the air.

A still further object of the invention is the provision of a self-contained heating and cooling apparatus of the kind under consideration incorporating novel arrangements and constructions for satisfying the various component air supply requirements.

An additional object of the invention is the provision of a self-contained heating and cooling apparatus of the kind under consideration wherein novel arrangements and constructions of component supporting structural members are employed for the purpose of accommodating within a single housing all of the components necessary to accomplish selective heating and cooling with a minimum utilization of space and material.

Still another object of the invention is the provision of an improved construction for the handling of condenser cooling air in a unit of the kind described so that efficient flow of the air within a confined space compatible with preselected housing envelope dimensions will ensue.

A still further object of the invention involves the provision of a heating and cooling apparatus of the type described wherein a novel compartmentalized housing is employed for the purpose of accommodating a separate cooling subassembly and a separate heating subassembly.

Another object of the invention is the provision of improved apparatus for heating and cooling air for supply to an enclosure wherein structural members are employed in a novel manner to form compartments certain of which provide passage for air necessary to support combustion of the fuel supplied to heat the air under heating cycle operation.

In apparatus utilizing a direct fired heat exchanger as a heat source for heating air, provision must be made to vent the products of combustion formed therein to the ambient or to other suitable locale. Accordingly, it is another object of the invention to utilize the means for purging the apparatus described of the products of combustion to assist in the provision of combustion air to the burner unit in the direct fired heat exchanger.

These and other objects of the invention will be apparent upon a consideration of the ensuing specification and drawings in which:

FIGURE 4 is a fragmentary view in section taken along lines 4—4 on FIGURE 2 illustrating the orientation of the fan and condenser of the refrigeration system employed in the apparatus.

FIGURE 6 is a view, in perspective, of the partition and wall arrangement, together with certain of the side panels illustrating the orientation of the structural components in the apparatus.

FIGURE 7 is an exploded view showing the relationship between the partition and wall arrangement and the refrigeration system.

Figure 1:
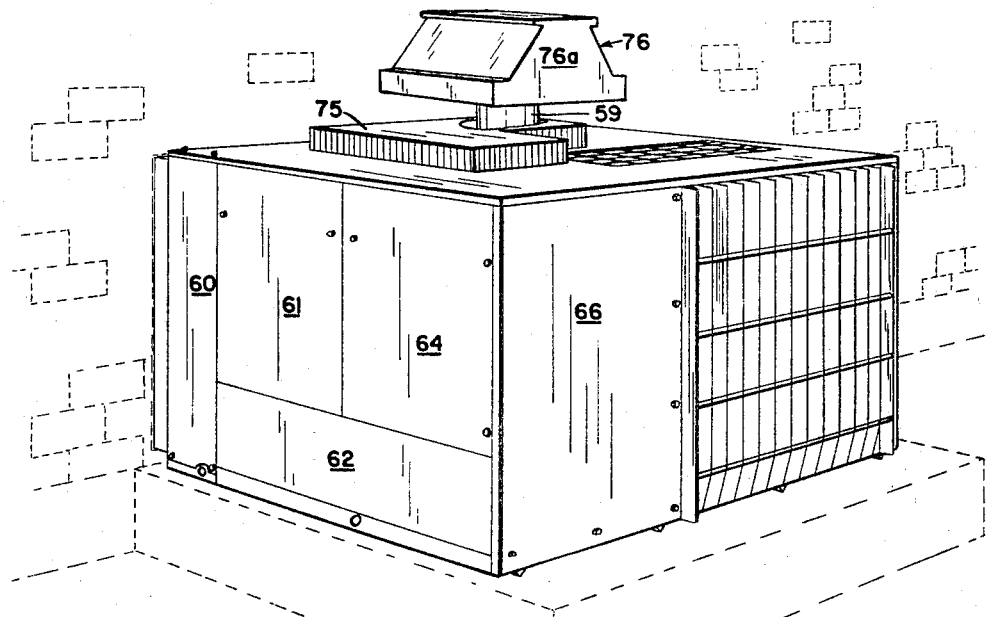
FIGURE 1 is a perspective view of air heating and cooling apparatus embodying the invention wherein the apparatus is shown in communication with openings in the wall of a residential unit.

Referring to the drawings for an illustration of a preferred embodiment of the invention, there is shown air heating and cooling apparatus particularly suited for circulating either heated or cooled air within a residential unit.

One of the features of the invention is the provision of self-contained air heating and cooling equipment wherein only a minimum of space is required to accommodate the unit. Attainment of this feature is due, in part, to the novel arrangement of walls and partitions within the housing or casing incorporating the air heating and cooling equipment. The walls and partitions form compartments and chambers, some isolated from each other and some in communication with each other, depending in a large measure upon the air flow requirement of the elements or subassembly located in the particular space.

A base pan 10 is employed for the purpose of supporting the elements, both operational and structural, of the unique air heating and cooling unit forming the invention. The base pan 10 is provided with upstanding flanges about the periphery to which other structural elements such as panels may be connected to form a housing or casing for the equipment. The upstanding flange at one side of the pan has a portion 10′ extending outwardly thereof so as to be substantially parallel to the body portion of the pan. Preferably the base pan is made by stamping and forming a sheet metal member of steel coated with zinc.

As mentioned above, the structural members include a unique partition and wall arrangement including a partition 12 extending across the pan 10 to divide the unit into a forward compartment, accommodating a direct-fired heating unit and an evaporator serving as a cooling unit, together with a blower for supplying air over the two heat transfer members, and a rearward compartment accommodating the condenser and compressor serving the evaporator. Partition 12 is composed of sheet metal material formed with flanges permitting connection with the pan and other elements of the apparatus as will be hereinafter apparent. The partition 12 has a peripheral portion removed so that upon assembly with pan 10 an opening 14 is formed providing communication between the forward and rearward compartments.

The unique partition and wall arrangement includes a wall member 16 extending rearwardly into the rearward compartment and terminating short of the rearward edge 11 of pan 10. The wall 16 also has an edge portion removed so that upon assembly with the partition 12 and the pan 10, a space 18 is provided permitting communication between the areas located on opposite sides of the wall 16.

In the forward compartment the unique partition and wall arrangement includes vertical wall 20 of a configuration comprising a first portion 22 substantially parallel to partition 12. Portion 22 is composed in turn of a section 24 of a height comparable to the height of partition 12 and a section 26, note FIGURE 7, of reduced height. Wall 20 also includes a section 27 extending outwardly from and at an inclination to the portion 22. It has a height comparable to the height of portion 22 and partition 12. Appropriate flanges are provided on each of the portions for securing the wall to other structural members of the unit.

Figure 3:
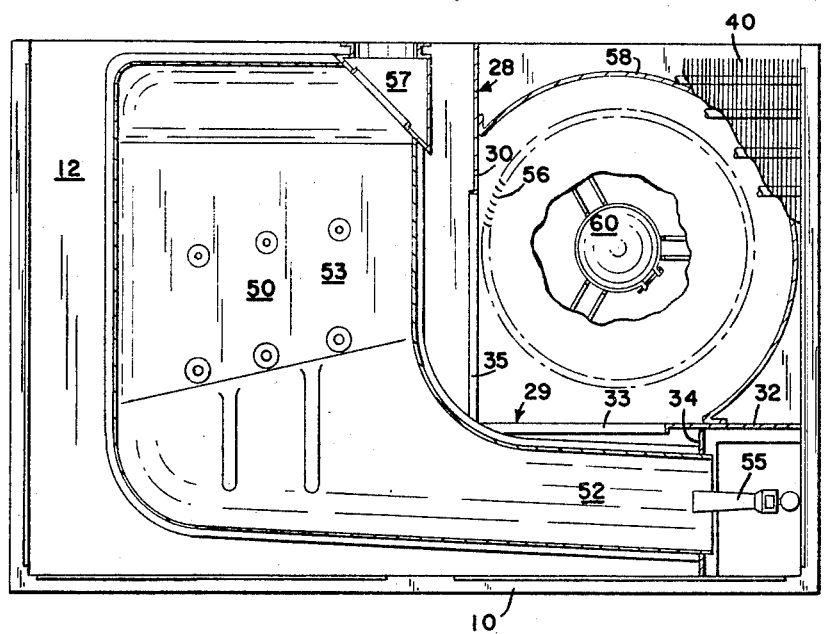
FIGURE 3 is an elevational view taken along lines 3—3 on FIGURE 2 wherein certain parts are broken away in the interest of clarity.

Connecting wall 28, note FIGURE 3, joins partition 12 and wall 20 and comprises an upright or vertical section 30 extending from the top of the partition 12 and wall 20 downwardly to the intersection of the top edge of section 26, and a horizontal or shelf section 32. Connecting wall 28 is formed from a relatively flat sheet metal material having an opening 29 provided therein. After bending the sheet to the configuration described, a portion 33 of the opening is disposed in the horizontal section 32 and a portion 35 in the vertical section 30. An apertured vestibule wall 34 connects the underside of the shelf section 32 with the pan 10 and extends between the partition 12 and wall 20.

As mentioned above, the forward compartment accommodates the heating unit, as well as the evaporator of the refrigeration system, together with air handling equipment. The forward compartment comprises a conditioned air chamber and a fuel burner chamber. The conditioned air chamber is so defined because it accommodates flow of air to be either heated or cooled depending on the requirement. In the construction described the evaporator coil 40 is placed in the part of the forward compartment referred to as the conditioned air chamber. Condenser 42 is arranged in the rearward compartment along the rear side of pan 10 and forms with wall 16 a condenser chamber for accommodating a fan and orifice plate assembly 44 to draw air inwardly through the rear of the apparatus over the condenser and discharge it outwardly through an opening in the top cover of the apparatus. An important feature of the invention involves arranging the orifice plate 46 at an inclination to the condenser 42 in the manner shown in FIGURE 4. With such an arrangement, the fan discharges air previously passed in heat transfer with the condenser into a plenum 47, the cross-section of which increases throughout the path of air flow through the plenum. Thus the air is free to expand and diffuse as it emerges from the fan reducing turbulence losses and providing a more efficient flow pattern for the air leaving the condenser. The compressor 48 is arranged in compressor chamber 49 formed by wall 16, certain side and rear panels and partition 12. The usual refrigerant flow conduits as well as refrigerant metering means are connected with the compressor, condenser and evaporator to form a conventional refrigeration circuit.

Figure 2:
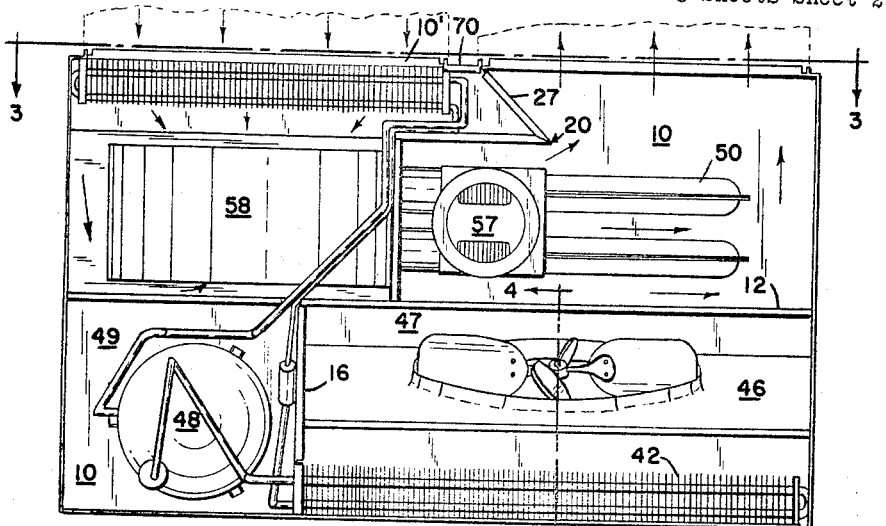
FIGURE 2 is a plan view of the apparatus shown in FIGURE 1 with the top cover assembly removed to show the disposition of the operating components.

The heating unit employed to heat air comprises a direct fired gas heating device consisting of one or more heat exchanger elements 50 of a generally L-shaped configuration of the kind disclosed and claimed in United States patent application S.N. 41,981, filed July 11, 1960, now United States Patent No. 3,140,706, and assigned to the assignee of the invention. Each heat exchanger element has a first end portion secured to the vestibule wall 34 as by welding. The heat exchanger includes a portion 52 extending substantially horizontally from the wall into the conditioned air chamber having an outlet for connection to a duct supplying air from the chamber to the area or enclosure being served, note FIGURE 2. The portion 52 has integrally formed therewith a generally vertical portion 53 serving to define an L-shaped heat exchanger.

Supported on shelf 32 of connecting wall 28, in registry with the opening 29 is a fan motor assembly including a fan or blower 56 of the centrifugal type, a partial scroll 58 and a motor 60 for driving the blower 56. Scroll 58 encloses portions 33 and 35 of opening 29. With the arrangement shown, air may be drawn into the apparatus through the evaporator into the inlet of the blower 56. The air is then discharged from the partial scroll 58 over portion 52 of the heat exchanger element or elements and upwardly over the portion 53 in conditioned air chamber to the outlet of the apparatus. The described path of air flow enables air from the enclosure being served to be either heated or cooled depending upon the requirement at the time. If it is desired to heat the air, a gas burner unit 55, having conventional ignition equipment is located in the fuel burner chamber formed by the side of vestibule opposite the side from which the heat exchanger extends, the partition 12 and section 26 of wall 20 and a side panel. Fuel from a supply main is directed to the burner where a combustible gas-air mixture is formed and fired into the heat exchanger. The products of combustion flow into a collection box 57 located at the uppermost end of the heat exchanger and are discharged to the atmosphere through a flue 59 and vent termination hood 76. In order to provide for the effective disposal of condensate that might form in the heat exchanger during cooling cycle operation, it has been found desirable to incline the heat exchanger in the manner shown in FIGURE 3.

The air heating and cooling apparatus illustrated includes, in addition to the partition, and wall arrangement described, a plurality of flanged panels arranged to be connected to the pan 10 and various walls and partitions to form a casing for the apparatus. As shown in FIGURE 1 the side of the apparatus adjacent the gas burner assembly, blower wheel assembly and compressor, is composed of a number of panels so as to permit easy access to any of these assemblies. Panel 60 is connected to the corner of the pan and includes a flange to which the evaporator assembly may be connected. Adjacent to panel 60 is a blower access cover 61 concealing the opening through which the blower assembly is inserted. Located below cover 61 is burner access door 62 having a retainer element, not shown, connected to the inner surface so that the door may be frictionally fitted to the inner surface on pan 10 and secured with conventional fastening elements. Panel 64 is arranged to be removably secured to partition 12 and the flanged end of rear panel 66 so as to permit access to the compressor chamber wherein certain electrical elements, not shown, controlling the operation of the various system components are located.

The rear panel 66 extends across the compressor chamber to the left hand side of the condenser coil assembly. The side of the apparatus adjacent the right hand limit of the condenser coil is enclosed by side panel 68, the front end of which defines a side of the apparatus outlet accommodating a duct for transmitting conditioned air to the enclosure. Central panel 70 is connected to section 27 of wall 20 and provides opposed flanges for duct connections. A top cover assembly, to be later described, completes the casing. It will be appreciated that the various panels, covers and doors, are provided with flanges both normal and parallel to the plane of the structure in a manner known to those skilled in the art permitting easy and rapid assembly and disassembly. Accordingly, it is not deemed necessary for the purpose of describing this invention to illustrate in detail each of the structural panel units.

With the panels, covers and door, connected to surround the operating components of the apparatus, a top cover assembly including member 71 is provided to complete the housing. The top cover 71 is formed of sheet metal material and provided with flanges permitting assembly with the structural elements described. Also provided in the top cover 71 are three openings 72, 73 and 74. Opening 72 is arranged to overlie the condenser discharge plenum to serve as an exit for air delivered by condenser fan. Opening 73 overlies the chamber accommodating the compressor for a purpose to be later explained. Circular opening 74 accommodates the flue through which the products of combustion formed in the heat exchanger pass to the atmosphere.

Figure 5:
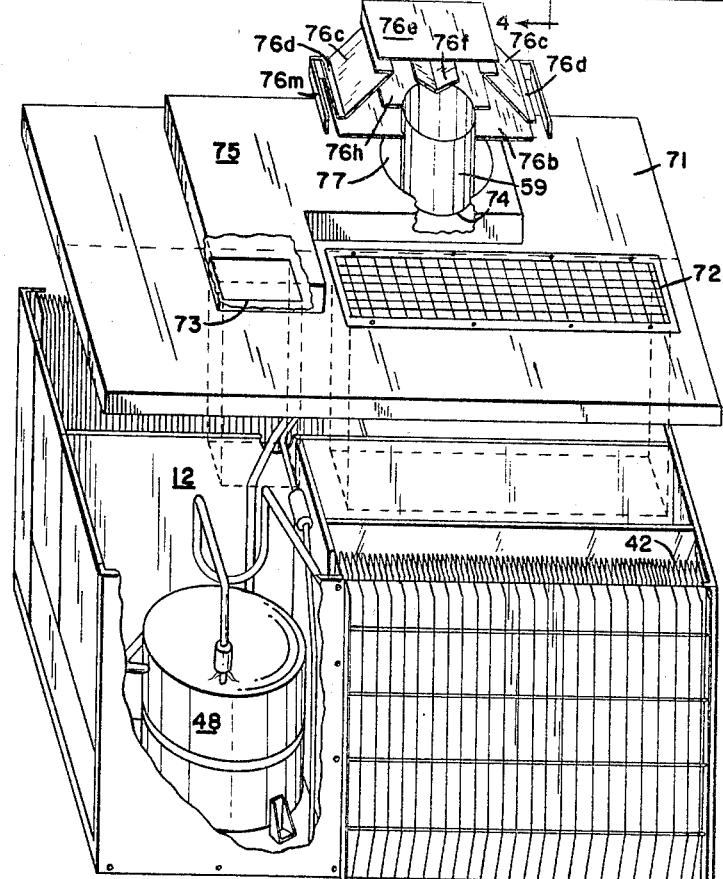
FIGURE 5 is an exploded view with certain parts broken away and certain parts shown in section, showing the top cover assembly and the housing or casing enclosing the operating components.

Completing the top cover assembly is a channel-shaped member 75 adapted to form, in conjunction with the upper surface of cover 71, a duct for the flow of ambient air into the housing to satisfy the air flow requirements of certain of the components situated within the housing. The channel-shaped member 75 is provided with an opening 77 slightly larger in diameter, and in registry with, the opening 74. When assembled on the upper surface of the cover 71, one end of member 75 overlies opening 73. Vent termination hood 76 is assembled about the end of the flue projecting upwardly from the housing. Vent termination hood 76 is arranged so that air pressure in the vicinity of opening 77, wherein combustion air is supplied to the gas burner unit 55, is so related to the air pressure at the discharge of the hood that positive flow of the products of combustion is assured and reverse flow of air under the influence of "back draft" sufficient to extinguish the pilot or prevent normal purging of the products of combustion is prevented under high atmospheric wind conditions. To this end, the hood 76 is composed of opposed side plates 76a, note FIGURE 1, connected by a base 76b having an opening accommodating flue 59, inclined end plates 76c having parallel flanges 76d and cover 76e arranged in spaced relation to the upper flanges 76d. Lower flanges 76d of end plates 76c are formed with vertical baffle 76m in the manner shown in FIGURE 5 to further assure proper flow of flue gas. V-shaped baffle 76f is arranged to direct flow from flue 59 in two directions, depending upon the direction of atmospheric air flow. Central plate 76h engages a stop member, not shown, on the flue to position the hood to assure a space between the underside of base plate 76b and the upper surface of member 75. With the arrangement shown, the apparatus may be operable in snow reaching a depth measured by the height of cover 71 above the ground without interference with the flow of combustion air to the gas burner 55. Further, the arrangement of baffles assures prevention of "short-circuiting" of the air flowing from the hood.

Considering the operation of the air heating and cooling apparatus, which it is understood may be conveniently located adjacent a house or other residential unit in communication with a duct supplying air to the structure and a duct receiving air from the structure, suitable conventional controls, not shown, are manipulated to selectively energize the direct-fired heating equipment or the refrigeration system. In either case, the blower operates to draw air into the forward compartment over the evaporator and discharges it over the heat exchanger into the duct supplying air to the enclosure. Under circumstances where it is required to heat the air being supplied by blower to the enclosure served thereby, gaseous fuel flows to the burner where it is ignited and delivered through the heat exchange unit. Air from the enclosure is supplied over the heat exchanger by blower and is heated thereby. The products of combustion flow from the collector 57 through flue 59 to the atmosphere through vent termination hood 76. Air necessary for mixture with the gaseous fuel delivered through supply main to the burner assembly is available through a path originating with the space defined by opening 77 surrounding the flue. The duct formed by the member 75 and cover 71 directs the air to opening 73 where it flows through chamber accommodating the compressor, and into the burner chamber through communicating opening 14. It will thus be obvious that air from the atmosphere is available without providing openings in the side panels which permit access to the burner assembly chamber by children or foreign material or malfunction due to rain, wind or snow.

If it is desired to operate the apparatus to supply cooled air to the enclosure the controls are manipulated to activate the refrigeration system and condenser fan as well as the blower. At this time the flow of fuel to the direct fired heating unit is terminated. With the compressor energized the temperature of the evaporator is reduced and air, flowing into the apparatus under influence of blower, cooled. The cooled air is transmitted over the inactive heat exchanger of the heating unit and delivered to the dust supplying air to the enclosure. Air sufficient to cool the compressor is induced to flow in a path including the space surrounding flue, duct 75, opening 73, through the compressor chamber, and opening 18 to the suction side of condenser fan, from which point the air is returned to the atmosphere through opening 72 having a suitable grille positioned thereover.

It will be appreciated that the conditioned air chamber may be provided with thermal insulation and a filter, if desired. The apparatus described is readily adaptable to a variety of installations. For example, the apparatus may be supported upon a platform located on a roof of a building so that air may circulate therethrough with the assistance of suitable ducts and conventional adaptors.

The construction described enables one to utilize a combination air heating and cooling unit located entirely outdoors without the need for expensive weather protection equipment or costly construction for assuring proper discharge of the products of combustion under the wide range of atmospheric conditions encountered. In conventional air heating furnaces, in order to assure a balanced pressure condition at the inlet and outlet of the heat exchanger, a draft diverter is provided. The function of the draft diverter is to overcome the effect of a temporary pressure unbalance in the unit. Heretofore, when the air heating apparatus has been located outdoors it has been necessary to incorporate structure serving the same function as the draft diverter. In the construction described above, the unique arrangement of parts eliminates the need for such a construction.

While we have described a preferred embodiment of our invention, it will be understood the invention is not limited thereto but may be embodied within the scope of the following claims.

We claim:

1. Apparatus for selectively heating and cooling air for supply to an enclosure comprising means including a top cover member having an opening therein forming a casing for said apparatus; partition means arranged within said casing to form a condenser compartment, a compressor compartment, and a compartment for the flow of air to be conditioned; a refrigeration system arranged within said casing, said system including a condenser mounted in said condenser compartment, an evaporator mounted in said conditioned air flow compartment and a compressor mounted in said compressor compartment; air heating means, including a direct fired heat exchanger for receiving relatively high temperature fluid for flow therethrough, positioned in said conditioned air flow compartment; selectively operable fuel burner means communicating with said top cover member opening for supplying relatively high temperature fluid to said heat exchanger and fan means for drawing air separate from that necessary to operate said fuel burner means into said conditioned air flow compartment over said evaporator to cool said air when said refrigeration system is activated, said fan means being effective to discharge air over said heat exchanger to heat said air for supply to said enclosure upon energization of said fuel burner means.

2. Apparatus as set forth in claim 1 wherein said top cover member includes an opening overlying the compressor compartment.

3. Apparatus as set forth in claim 2 wherein said partition means form a chamber for accommodating fuel burner means, said chamber being in communication with the interior of said heat exchanger while isolated from the conditioned air flow compartment.

4. Apparatus as set forth in claim 3 wherein said partition means have openings formed therein providing communication between said condenser and compressor compartments as well as communication between said compressor compartment and said fuel burner chamber such that air necessary for proper combustion action in the fuel burner means is supplied in a path including the top cover opening, compressor compartment and the opening providing communication between the compressor compartment and the fuel burner chamber.

5. Apparatus as set forth in claim 4 wherein fan means are provided in said condenser compartment for drawing air through said condenser and discharging it from the apparatus, said fan being arranged so that the suction thereof is in communication with the opening between the compressor and condenser compartment.

6. Air heating and cooling apparatus comprising a base member supporting both structural and operational components of the apparatus, panel means connected to said base member and a top cover member arranged with said panel means and said base to form an enclosure having limited access thereto; partition and wall means arranged within said enclosure to form a forward and rearward compartment; a refrigeration system arranged within said enclosure, said system including an evaporator disposed in said forward compartment, a compressor and a condenser, said condenser being arranged within said rearward compartment; a centrifugal fan assembly including a blower and scroll means disposed in said forward compartment adjacent said evaporator for routing air over said evaporator and discharging same into the area being served; and a direct fired air heating unit including fuel burner means and at least one heat exchanger located in said forward compartment, a flue extending from said enclosure through an opening provided therein, said flue communicating with said heat exchanger to pass the products of combustion formed therein to the atmosphere, said opening being larger than the flue enabling air flow into the apparatus for support of combustion, a vent termination hood attached to the outer end of the flue, said hood being operative to prevent atmospheric pressure from imposing a negative pressure differential across the burner means, said heat exchanger being positioned adjacent said blower to receive air flowing therefrom, and having a configuration including a horizontal portion and a vertical portion having a height comparable to the height of said evaporator, whereby air flowing through said forward compartment may be either heated or cooled.

7. Apparatus as set forth in claim 6 wherein said partition and wall means form separate chambers for the condenser and compressor and a separate chamber for the fuel burner means serving the direct fired air heating unit chambers having communication therebetween.

8. Apparatus as set forth in claim 7 wherein said flue means for discharging the products of combustion formed in the heat exchanger extends vertically from said casing.

9. Apparatus as set forth in claim 8 wherein said top cover member is provided with a first opening overlying said compressor chamber and a second opening overlying said forward compartment, surrounding the flue means projecting therefrom.

10. Apparatus as set forth in claim 9 including an inverted channel shaped member having an opening encircling the flue means in spaced relation thereto and forming with the upper surface of said top cover an enclosed passageway for the flow air between the path between the opening encircling the flue means and the opening in the top cover overlying said compressor chamber.

References Cited by the Examiner
UNITED STATES PATENTS

| | | | |
|---|---|---|---|
| 2,173,280 | 9/1939 | Tourneau | 257—295 |
| 2,292,562 | 8/1942 | Huggins | 257—295 |
| 2,739,794 | 3/1956 | Graham | 165—30 X |
| 2,759,472 | 8/1956 | Cartter | 126—91 |
| 2,773,676 | 12/1956 | Boyle et al. | 257—295 |
| 2,779,572 | 1/1957 | Holman | 165—63 X |
| 2,816,423 | 12/1957 | Brugler | 257—295 |
| 2,843,108 | 7/1958 | Campbell et al. | 126—110 |
| 2,886,955 | 5/1959 | Bauman | 165—63 X |
| 2,904,316 | 9/1959 | Hagen et al. | 257—137 |
| 2,913,229 | 11/1959 | Hood et al. | 257—295 |
| 2,934,324 | 4/1960 | Partington | 257—295 |
| 2,983,484 | 5/1961 | Wood | 257—137 |

ROBERT A. O'LEARY, *Primary Examiner.*

CHARLES SUKALO, *Examiner.*

M. A. ANTONAKAS, *Assistant Examiner.*

UNITED STATES PATENT OFFICE
CERTIFICATE OF CORRECTION

Patent No. 3,277,956                                  October 11, 1966

Robert L. Hughes et al.

It is hereby certified that error appears in the above numbered patent requiring correction and that the said Letters Patent should read as corrected below.

Column 3, line 1, after "objects" insert -- and features --; column 5, line 46, strike out "to the inner surface" and insert instead -- over the flange --; column 7, line 12, for "dust" read -- duct --.

Signed and sealed this 22nd day of August 1967.

(SEAL)
Attest:

ERNEST W. SWIDER                              EDWARD J. BRENNER
Attesting Officer                                    Commissioner of Patents